United States Patent
Hallivuori

(10) Patent No.: US 9,495,286 B2
(45) Date of Patent: Nov. 15, 2016

(54) METHOD AND ARRANGEMENT FOR COMPLETION OR RECOVERY OF DATA TRANSACTIONS IN A FLASH TYPE MEMORY DEVICE USING A COMMIT PROCESS

(75) Inventor: Matti Hallivuori, Espoo (FI)

(73) Assignee: CORIANT OY, Espoo (FI)

( * ) Notice: Subject to any disclaimer, the term of this patent is extended or adjusted under 35 U.S.C. 154(b) by 1505 days.

(21) Appl. No.: 12/303,437

(22) PCT Filed: Jun. 7, 2007

(86) PCT No.: PCT/FI2007/000162
§ 371 (c)(1),
(2), (4) Date: Dec. 4, 2008

(87) PCT Pub. No.: WO2007/141375
PCT Pub. Date: Dec. 13, 2007

(65) Prior Publication Data
US 2009/0313501 A1  Dec. 17, 2009

(30) Foreign Application Priority Data
Jun. 8, 2006 (FI) .................................. 20060571

(51) Int. Cl.
*G06F 12/02* (2006.01)
*G06F 9/46* (2006.01)
(Continued)

(52) U.S. Cl.
CPC ........... *G06F 12/0246* (2013.01); *G06F 9/466* (2013.01); *G06F 9/467* (2013.01); *G06F 11/1471* (2013.01);
(Continued)

(58) Field of Classification Search
CPC .............. G06F 12/0246; G06F 11/1474; G06F 11/1471; G06F 9/467; G06F 9/466;
(Continued)

(56) References Cited

U.S. PATENT DOCUMENTS 5,838,614 A  11/1998  Estakhri
5,982,664 A  11/1999  Watanabe
(Continued)

FOREIGN PATENT DOCUMENTS

EP  1510924  3/2005
WO  2007100197  9/2007

OTHER PUBLICATIONS

International Search Report dated Oct. 24, 2007, in PCT application.
(Continued)

*Primary Examiner* — Arpan P. Savla
(74) *Attorney, Agent, or Firm* — Young & Thompson

(57) ABSTRACT

The invention relates to a method and arrangement for processing transactions in a flash type memory device, wherein the transaction is a data update and/or changing operation consisting of one or more suboperations, all of which must be successfully executed in order to regard the discussed transaction as having been successfully completed in its entirety. In the solution according to the invention, memory-block specific status information (131) of a memory block present in a flash type memory device is utilized not only for managing payload data (141) present in the memory block but also for the management of an entire transaction. Consequently, there is no need for a separate status bookkeeping of transactions, thus reducing the number of reading and writing operations required in transactions.

34 Claims, 3 Drawing Sheets

(51) Int. Cl.
*G06F 11/14* (2006.01)
*G06Q 20/34* (2012.01)
*G07F 7/08* (2006.01)
*G07F 7/10* (2006.01)

(52) U.S. Cl.
CPC ......... *G06F 11/1474* (2013.01); *G06Q 20/341* (2013.01); *G06Q 20/346* (2013.01); *G06Q 20/35765* (2013.01); *G07F 7/084* (2013.01); *G07F 7/1008* (2013.01)

(58) Field of Classification Search
CPC .................. G06F 7/084; G06F 7/1008; G06Q 20/35765; G06Q 20/341; G06Q 20/346
See application file for complete search history.

(56) References Cited

U.S. PATENT DOCUMENTS

| 7,254,592 | B1* | 8/2007 | Matero |
| 2003/0088804 | A1* | 5/2003 | Lasser ............................ 714/5 |
| 2005/0216653 | A1 | 9/2005 | Aasheim |
| 2005/0286306 | A1* | 12/2005 | Srinivasan et al. ...... 365/185.22 |

OTHER PUBLICATIONS

Finnish Priority Search Report dated Jun. 6, 2007, in priority application.

* cited by examiner

METHOD AND ARRANGEMENT FOR COMPLETION OR RECOVERY OF DATA TRANSACTIONS IN A FLASH TYPE MEMORY DEVICE USING A COMMIT PROCESS

FIELD OF THE INVENTION

The invention relates to a method for processing transactions in a flash type memory device, wherein the transaction Is a data update and/or changing operation consisting of one or more suboperations, all of which must be successfully executed in order to regard the discussed transaction as having been successfully completed In its entirety. The Invention relates also to an arrangement for processing transactions in a flash type memory device.

BACKGROUND OF THE INVENTION

The concept of transaction is used in the maintenance of such information systems in which the pieces of information stored in the system must be compatible or non-contradictory with each other at every time instant. One conceivable example is a banking application, wherein a given bank account involves information such as a balance and account transactions. Assuming an exemplary situation, wherein the information regarding account transactions would have had recorded therein an entry representing a deposit or withdrawal transaction, but updating the account balance information has not been managed yet. If, at this point, the information system was to fall into an error condition, i.e. to crash, the restart procedure would possibly create a situation in which the sets of information regarding the bank account would have a mutual discrepancy therebetween: the balance information and the information regarding account transactions would not comply with each other. The occurrence of a mismatch as described above can be avoided in such a way that the operations relevant to information stored in the system be processed as suboperations included in a single data processing entity or transaction, all of which must be successfully executed in order for said transaction to be considered successfully completed. In the event that all suboperations have not become successfully executed, none of the suboperations is considered as executed. In the foregoing exemplary situation, this means that for example a new transaction entry is not valid until after a matching update has been made in balance information and both the transaction entry and the updated balance information have each been validated simultaneously.

In this document, the concept of transaction is used in reference to a data processing entity constituted by one or more suboperations, wherein all suboperations must be successfully executed for a transaction to be regarded as successfully completed. The transaction is usually divided into three successive operations: a start of transaction, an update of data, and a commitment of transaction. The update of data comprises changing existing data, deleting existing data, and adding new data. The commitment refers to processing the updated data into valid data. The data, for whose changing, deletion or addition a transaction is executed, is in this document referred to as payload data. Valid payload data prior to the commitment of a transaction consists of that payload data which is consistent with the condition prior to starting the transaction. In a recovery process subsequent to a serious system malfunction (for example a system crash), which has taken place during a transaction, said transaction shall be concluded provided that the start of a commitment process has been reached, i.e. all updates have been managed. If this is not the case, not a single update relevant to the transaction shall be validated.

Sets of hardware used for implementing information systems are often provided with two types of memory: a non-volatile memory and a volatile memory. The information present in a non-volatile memory is available for service in a recovery process subsequent to a serious system error. On the other hand, the information present in a volatile memory is usually lost in the occurrence of a serious system error. The situation discussed in this document is such that the non-volatile memory is implemented by way of a flash type memory device. A typical feature in semiconductor flash memory circuits is that data present in the memory cannot generally be updated in one physical storage location without first erasing away an entire memory block. After a block-level erasion, all bits of the erased memory block have a common value, which is usually '1'. Each bit of the memory block can be changed thereafter separately for another value, which is usually '0'. After this, the only way of changing the value a discussed bit is to erase the entire memory block away again.

In this document, the term "flash type memory device" is used in reference to a memory device designed with one or more semiconductor flash memory circuits or to a logical flash memory device or LFMD device adapted to function according to the typical features of semiconductor flash memory circuits. For example, a magnetic diskette drive or a static RAM device (Random Access Memory) can be adapted to function the same way as an LFMD device. In addition, the flash type memory device can be a medium which has a semiconductor flash memory circuit linked to a memory device configured with other technology, such as a magnetic diskette drive or a static RAM device.

PRIOR ART

Publication WO0131458 "Method and arrangement for performing atomic updates using a logical flash memory device" discloses a solution, wherein the processing of a transaction in a flash type memory device is effected by using a transaction-specific identifier variable, expressing that the transaction is not finished. Said identifier variable is stored in a flash type memory device, such that the information contained in said identifier variable would not be lost in a possible system error. The identifier variables relevant to various transactions are stored in a memory block (memory blocks) of a flash type memory device, which is (are) reserved therefor. In addition, each memory block of the flash type memory device, which houses payload data to be updated in connection with a transaction, contains memory-block specific status information regarding that particular memory block. This status information expresses whether the updating operation of control and payload data present in the examined memory block is unfinished or finished.

When a new transaction is started, the identifier variable relevant to this particular transaction is added to the list of identifier variables for active transactions. The discussed list has been stored in one or more memory blocks of a flash type memory device reserved therefor. Once a transaction has been concluded, the identifier variable relevant to the discussed transaction is deleted from said list. Hence, such identifier variable are used for maintaining a status bookkeeping for transactions, which expresses on-going transactions in real time. Each change in a list of identifier variables for active transactions requires one writing operation and the erasion of a memory block. Thus, every transaction requires two writing operations and two erasions for a memory block used for storing the identifier variable of said transaction.

An individual memory block in a flash type memory device survives a limited number of writing operations. In other words, the memory block wears down as writing operations are repeated a sufficient number of times. When even one of the memory blocks of a memory device is faulted, a replacement of the entire memory device is generally inevitable. Moreover, frequently repeated writing operations, for example in connection with semiconductor flash memory circuits, reduce the number of free memory blocks. Clearing a memory block in a semiconductor flash memory circuit is a considerably slower procedure than reading information from a memory block. In the event that a change needs to be done in information present in a given memory block, this particular memory block must be first cleared, followed by writing the changed information. The resulting speed problem can be solved in such a way that the changed data is written in another, previously cleared memory block, whereby the memory block that was in service before need not be cleared until after the file update. However, the result of frequently repeated clearing and writing operations is that there are a large number of memory blocks currently in a clearing process or waiting for a clearing process at any given time, thus reducing the number of memory blocks available for service.

SUMMARY OF THE INVENTION

The invention relates to a method intended for the execution of transactions relevant to information to be stored in a flash type memory device, said method enabling the elimination or alleviation of limitations and drawbacks existing in the prior art. The invention relates also to a recovery method associated with said method for recovering from a system error that has taken place during a transaction. The invention relates further to an arrangement intended for processing transactions relevant to information to be stored in a flash type memory device, said arrangement enabling the elimination or alleviation of limitations and drawbacks existing in the prior art. The invention relates also to a computer program, which comprises program-equipped elements for processing transactions of information to be stored in a flash type memory device so as to enable the elimination of alleviation of limitations and drawback existing in the prior art.

It has been surprisingly discovered in this invention that memory-block specific status information can be used not only-for the management of payload data present in a memory block but also for the management of an entire transaction. Thus, a need to conduct a separate status bookkeeping of transactions will be avoided.

The invention provides a means of attaining the following benefits:
saving the storage capacity of a flash type memory device as separate status bookkeeping of transactions is not needed,
reducing the number of updating operations needed in a transaction as status bookkeeping of transactions need not be updated, and
reduction of updating operations increases the service life of a flash type memory device and reduces its power consumption.

A method of the invention for executing a transaction regarding information to be stored in a flash type memory device is characterized in that the method comprises:

executing a payload data writing operation relevant to said transaction into a memory block of said flash type memory device,
setting up memory-block specific status information of said memory block to express that said transaction is in a commitment process, and
processing the payload data written in said memory block into valid payload data.

A recovery method of the invention for recovering from a system error occurred during a transaction in equipment based on a flash type memory device is characterized in that the recovery method comprises:
reading memory-block specific status information regarding a memory block of said flash type memory device,
determining whether said memory-block specific status information expresses that said transaction is in a commitment process, and
processing the payload data present in said memory block into valid payload data in response to the condition in which said memory-block specific status information expresses that said transaction is in a commitment process.

An arrangement of the invention for processing a transaction regarding information to be stored in a flash type memory device is characterized in that the arrangement comprises management media, which are linked to said flash type memory device and which are adapted to:
execute a payload-data writing operation relevant to said transaction into a memory block of said flash type memory device,
set up memory-block specific status information of said memory block to express that said transaction is in a commitment process,
read the memory-block specific status information of said memory block and determine whether said memory-block specific status information has been set up to express that said transaction is in a commitment process, and
process the payload data written in said memory block into valid payload data in response to the condition in which said memory-block specific status information has been set up to express that said transaction is in a commitment process.

A computer program of the invention for processing a transaction regarding information to be stored in a flash type memory device is characterized in that the computer program comprises:
program elements for instructing a processing unit to execute a payload-data writing operation relevant to said transaction into a memory block of said flash type memory device,
program elements for instructing the processing unit to set up memory-block specific status information of said memory block to express that said transaction is in a commitment process,
program elements for instructing the processing unit to read the memory-block specific status information of said memory block and to determine whether said memory-block specific status information has been set up to express that said transaction is in a commitment process, and
program elements for instructing the processing unit to process the payload data written in said memory block into valid payload data in response to the condition in which said memory-block specific status information has been set up to express that said transaction is in a commitment process.

Various embodiments of the invention are characterized by what is presented in the dependent claims.

BRIEF DESCRIPTION OF THE FIGURES

The invention will now be described in more detail with reference to preferred exemplary embodiments and to the accompanying figures, in which.

DETAILED DESCRIPTION OF EMBODIMENTS OF THE INVENTION

Figure 1:
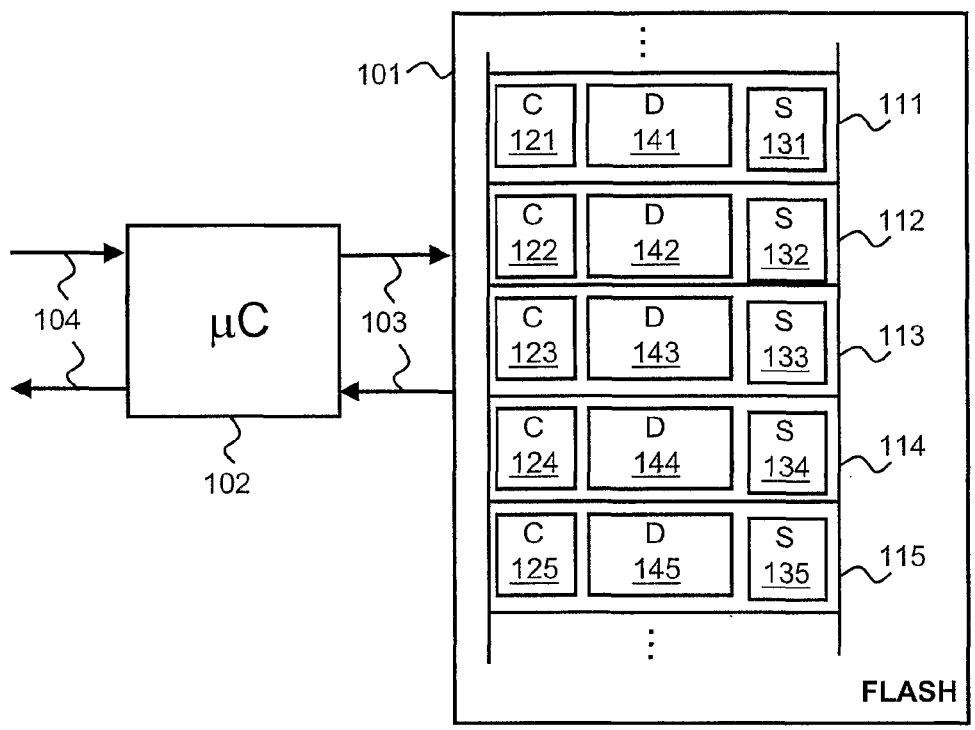
FIG. 1 shows an arrangement according to one embodiment of the invention for processing a transaction of information to be stored in a flash type memory device.

FIG. 1 shows an arrangement according to one embodiment of the invention for processing a transaction of information to be stored in a flash type memory device 101. The arrangement includes management media 102, which are linked to said flash type memory device 101. The management media 102 consist of one or more processors and interface elements for effecting a data transfer 103 between the flash type memory device and the management media, as well as a data transfer 104 between the management media and external sets of equipment. The management media 102 may further house one or more storage elements. The flash type memory device includes memory blocks, of which memory blocks 111-115 are shown in FIG. 1.

In each memory block of the flash type memory device 101 can be stored control data (C) 121-125 for that particular memory block. The control data C includes a preferably logical memory block identifier. The system comprises maintaining an address table, which links the physical address of each memory block to the logical memory block identifier of that particular memory block. This address table can be maintained for example in an internal scratch pad memory of the management media 102 or in such a memory block of the flash type memory device which has its physical address in all conditions available for the management media. In each memory block can be stored payload data (D) 141-145 and memory-block specific status information (S) 131-135.

The status information S enables expressing that:
payload data present in a memory block consists of valid payload data, or
payload data present in a memory block is dirty, or
payload data present in a memory block is correct, or
payload data present in a memory block is relevant and, in addition, the transaction is in a commitment process.

For example, the changed balance information of a bank account, which has been stored in a flash type memory device, but the transaction processing an account entry relevant thereto being still unfinished, represents payload data which is correct but not valid. The transaction may be unfinished for example for the reason that the account entry relevant to the change of balance information has not yet been stored in the flash type memory device.

The management media 102 are adapted to execute a payload-data D writing operation relevant to a transaction into a memory block of the flash type memory device 101, to set up the memory-block specific status information S of said memory block to express that said transaction is in a commitment process, to read the memory-block specific status information S of said memory block and to determine whether said memory-block specific status information S has been set up to express that said transaction is in a commitment process, and to process the payload data D written in said memory block into valid payload data in response to the condition in which said memory-block specific status information S has been set up to express that said transaction is in a commitment process.

First, the operation of a system according to the embodiment of the invention shown in FIG. 1 will be discussed in reference to a simple situation, in which a transaction only involves writing payload data to be updated in connection with the transaction in just one memory block. It is assumed that, at the start of a transaction, the memory block 111 is not in active service and thus available for writing operations. In other words, the memory block 111 is free as the transaction is started. It is also assumed that no changes are needed in memory block control data 121. Without any general restriction, it can be assumed that the payload data to be updated in the transaction is written in the memory block 111. Payload data 141 is written in the memory block 111 by the management media 102. The payload data 141 written in the memory block 111 can be intended for replacing payload data present in some other memory block, or the payload data 141 may consist of payload data just to be added, in which case it is not substituted for payload data present in any other memory block. The transfer to a transaction commitment process is implemented in such a way that, for status information 131, the management media write a value which expresses that the transaction is in a commitment process. This is followed by processing the payload data 141 present in the memory block 111 into valid payload data, which possibly replaces some older payload data present in any other memory block. This concludes the transaction. Various options for carrying out the validation of payload data shall be discussed later in this document.

Next, a situation will be discussed, in which a serious system error occurs before the payload data 141 is processed into valid payload data. In a recovery process following a serious system error, the status information 131 of the memory block 111 is read by the management media 102. In the event that the status information 131 expresses that the transaction has reached a commitment process, there is adequate certainty about the payload data 141 present in the memory block 111 having been successfully updated. Thus, the payload data 141 present in the memory block 111 is processed into valid payload data, which possibly replaces some older payload data present in any of the other memory blocks. In the event that the status information 131 does not indicate that the transaction has reached a commitment process, there is a risk of the payload present in the memory block 111 not being successfully updated. In this case, the transaction is cancelled and in the situation, in which the payload data 141 written in the memory block 111 is intended for replacing some older payload data present in any of the other memory blocks, said older payload data present in another memory block retains its status as valid payload data.

Next, the operation of a system according to the embodiment of the invention shown in FIG. 1 will be discussed in reference to a simple situation, in which a transaction involves writing payload data to be updated in connection with the transaction in more than one memory block of a flash type memory device. Without any general restriction, it can be assumed that payload data to be updated in a transaction is written in memory blocks 112, 113 and 114. Said memory blocks 112, 113 and 114 are presumed free as the transaction starts. Without any general limitation, it can be assumed that payload data is written first in the memory block 112, next in the memory block 1 13, and finally in the memory block 114. It is also assumed that no changes are required for control data C of the memory blocks.

Payload data 142 to be updated is written in the memory block 112 by the management media 102. Then, for status information 132, the management media 102 write a value which expresses that the payload data 142 present in the memory block 112 is correct. The payload data 142 in the memory block 112 is correct, but the transaction cannot be transferred to a commitment process as yet, because the writing operations into the memory blocks 113 and 114, included in said transaction, are yet to be carried out. Payload data 143 to be updated is written in the memory block 113 by the management media 102. Thereafter, for status information 133, the management media 102 write a value which expresses that the payload data 143 present in the memory block 113 is correct. Payload data 144 to be updated is written in the memory block 114 by the management media 102. After this, the payload data present in all memory blocks 112, 113 and 114 is correct, enabling a transfer of the transaction to a commitment process.

The management media 102 are adapted to transfer the discussed transaction to a commitment process by setting such a value for the memory-block specific status information 132 and/or 133 and/or 134 of at least one memory block 112 and/or 113 and/or 114 which expresses that the transaction is in a commitment process. In the event that the status information of the last written memory block 114 is not set up to express that the transaction is in a commitment process, the status information of the memory block 114 must be set up to express that the payload data 144 present in the memory block 114 is correct. It should be noted that status information, which expresses that a transaction is in a commitment process, expresses also at the same time that payload data stored in a memory block is correct.

This is followed by processing the payload data 142, 143 and 144 present in each memory block 112, 113 and 114 into valid payload data, which possibly replaces older payload data present in any other memory block. Thus, the transaction is concluded. The situation can be for example such that the payload data 142 present in the memory block 112 replaces the payload data 141 present in the memory block 111, the payload data 144 present in the memory block 114 replaces payload data 145 present in a memory block 115, and the payload data 143 present in the memory block 113 is just payload data to be added, in which case it does not replace payload data present in any of the other memory blocks. Various options for carrying out the validation of payload data will be discussed later in this document.

In the following, a situation will be discussed, in which a serious system error occurs before all of the payload data 142, 143 and 144 written in a transaction has been processed into valid payload data. In the recovery process following a serious system error, the management media 102 read the sets of status information regarding the memory blocks of a flash type memory device. As long as the memory-block specific status information of at least one memory block expresses that the transaction has reached a commitment process, there is provided sufficient certainty that the group of memory blocks, constituted by those memory blocks whose status information expresses that the transaction is in a commitment process and/or the data contained in the discussed memory block is correct, encompasses all those memory blocks into which the writing of payload data has been desired in the transaction. Thus, the payload data present in each memory block of said group is processed into valid payload data, which possibly replaces older payload data present in any of the other memory blocks. In the event that the memory-block specific status information of even a single memory block does not express that the transaction has reached a commitment process, there is a risk of said group of memory blocks not encompassing all those memory blocks into which the writing of payload data has been desired. Hence, the system error has created a situation that no writing at all has been managed into some memory blocks and/or the writing into some memory block has stopped in the middle of it. In this case, the transaction is cancelled, and in a situation in which payload data written in one of the memory blocks has been intended to replace older payload data present in another memory block, said older payload data present in said another memory block retains its status as valid payload data.

Subsequently in this document, those memory blocks of a flash type memory device, whose memory-block specific status information is used for expressing a transaction commitment process, shall be referred to as expressive memory blocks. Those memory blocks, in which the transaction comprises writing payload data to be updated, shall be referred to as updatable memory blocks. Preferably, just one of the updatable memory blocks is selected to serve as an expressive memory block.

In an arrangement according to one embodiment of the invention, the management media 102 are adapted to select an expressive memory block to be the updatable memory block with the smallest physical address. In addition, the management media 102 are adapted to set up the memory-block specific status information of an expressive memory block in two operations by first setting up the status information to express that payload data present in the expressive memory block is correct, and thereafter, when payload data present in all other updatable memory blocks is correct as well, by setting up said status information to express that the transaction is in a commitment process. Provided that the recovery process subsequent to a system error comprises reading the memory blocks in an ascending sequence of physical addresses starting from the smallest physical address, this embodiment of the invention offers the advantage that, finding an expressive memory block, which indicates that the transaction is in a commitment process, provides a certainty that all other memory blocks, in which data has been written in the transaction, can be located after finding the expressive memory block.

In an arrangement according to one embodiment of the invention, the management media 102 are adapted to select an expressive memory block to be the updatable memory block with the greatest physical address. In addition, the management media 102 are adapted to set up the memory-block specific status information of an expressive memory block in two operations by first setting up the status information to express that payload data present in the expressive memory block is correct, and thereafter, when payload data present in all other updatable memory blocks is correct as well, by setting up said status information to express that the transaction is in a commitment process. Provided that the recovery process subsequent to a system error comprises reading the memory blocks in a descending sequence of physical addresses starting from the greatest physical address, this embodiment of the invention offers the advantage that, finding an expressive memory block, which indicates that the transaction is in a commitment process, provides a certainty that all other memory blocks, in which data has been written in the transaction, can be located after finding the expressive memory block.

In an arrangement according to one embodiment of the invention, the management media 102 are adapted to select an expressive memory block to be the updatable memory block with the smallest physical address. In addition, the management media 102 are adapted to select the writing sequence of memory blocks such that the expressive memory block is last to be processed. Thus, the memory-block specific status information of the expressive memory block can be set up to indicate that the transaction is in a commitment process immediately after the desired data has been written in the expressive memory block.

In an arrangement according to one embodiment of the invention, the management media 102 are adapted to select an expressive memory block to be the updatable memory block which is last to have payload written therein in connection with a transaction. Thus, the memory-block specific status information of the expressive memory block can be set up to indicate that the transaction is in a commitment process immediately after the desired data has been written in the expressive memory block. The expressive memory block can be any updatable memory block other than the one with the smallest or greatest physical address.

Next, an exemplary situation will be discussed, wherein it is desirable in a transaction to write in a memory block 111 of the flash type memory device 101 the payload data 141, replacing the older payload data 142 stored in a memory block 112 of the flash type memory device 101. The payload data 142 constitutes valid payload data as the transaction starts.

In an arrangement according to one embodiment of the invention, the control data C stored in each memory block contains a cyclic age indicator and the management media 102 are adapted to determine an updated value for the cyclic indicator, which in the sequence of a preset rule follows the value of a cyclic age indicator present in the memory block 112, and to write, prior to a transfer of the transaction to a commitment process, said updated value of the cyclic age indicator into the memory block 111. Updating said cyclic age indicator can proceed for example in such a way that the cyclic age indicator has its value incremented by one as the transaction begins and, upon reaching a preset final value, the cyclic age indicator will be set to a preset initial value. Hence, each transaction has a certain cyclic age indicator value.

In an arrangement according to one embodiment of the invention, the management media 102 are adapted to set, prior to a transaction transfer to a commitment process, a logical memory block identifier contained in the control data 121 of the memory block 111 to have the same value as that of a logical memory block identifier of the memory block 112. By means of logical memory block identifiers, the management media 102 are adapted to determine which memory blocks contain mutual matching newer and older payload data, such as the memory blocks 111 and 112 in this particular exemplary case.

In an arrangement according to one embodiment of the invention, the management media 102 are adapted to write the control data C into a memory block prior to setting up the memory-block specific status information to express that payload data present in the memory block is correct. Hence, the memory-block specific status information, which indicates that the payload data is correct, indicates also that the control data is correct.

In an arrangement according to one embodiment of the invention, the management media 102 are adapted to write, prior to a transaction transfer to a commitment process, in the control data C of each memory block a transaction identifier capable of explicitly identifying the on-going transaction. Thus, the flash type memory device will have a capability of executing concurrently several parallel transactions. The management media 102 are adapted, on the basis of said transaction identifier, to determine a transaction under which a given memory block is operated.

In an arrangement according to one embodiment of the invention, the management media 102 are adapted to write memory-block specific status information S in a storage space subsequent to information T to be written in said memory block. The storage space subsequent to information T refers to an area in the address space of said memory block, which in the ascending sequence of physical addresses follows that area in the address space of said memory block in which the information T is stored. This enables writing the information T and the memory-block specific status information S in a single session one after the other and the correctness of the status information S serves as certifier that writing of the information T has been successful.

In an arrangement according to one embodiment of the invention, the information T is a transaction identifier.

In an arrangement according to one embodiment of the invention, the information T represents header information of said memory block. The memory block header information consists typically of control data C.

In an arrangement according to one embodiment of the invention, the information T represents all other information to be written in said memory block except said status information.

In an arrangement according to one embodiment of the invention, the management media 102 are adapted to express, by means of the memory-block specific status information S, the following possible conditions:

A: memory block is free for writing,
   B: payload data present in memory block is correct,
   C: transaction is in a commitment process,
   D: payload data present in memory block is valid, and
   E: payload data present in memory block is dirty.

In an arrangement according to one embodiment of the invention, a status A indicates that a memory block in a semiconductor flash memory circuit is in a condition, in which all bits of the memory block have a common value, which is usually '1'. Each bit of the memory block can be thereafter be changed for another value, which is usually '0'. After this, the only way of changing the value of a discussed bit is to initialize the entire memory block clear again. The management media 102 are adapted to subject a memory block in status E to an initialization operation, whereby said memory block proceeds to status A.

In an arrangement according to one embodiment of the invention, the management media 102 are adapted to implement any of the following status transitions: from status A to status B, from status B to status C, from status C to status D, and from status D to status E, by changing the value of just one bit in a bit vector representing said memory-block specific status information. Thus, for example, a transition from status B (payload data in memory block is correct) to status C (transaction is in a commitment process) is atomaric such that the status transition either occurs completely or fails to occur at all. A partial occurrence of the status transition, for example as a result of a system error, is not possible as the value of an individual bit either changes or does not change. The conditions A, B, C, D and E can be presented for example by the following, status-information representing bit vectors:
A: 1111 (memory block is free for writing)
B: 0111 (payload data in memory block is correct)
C: 0011 (transaction is in a commitment process)
D: 0001 (payload data in memory block is valid)
E: ***0 (payload data in memory block is dirty).
wherein '*' is a wildcard allowed to be either '0' or '1'.

The status transition from status A to status D is not atomaric. Because of a system error, for example, it is possible that a desired status transition from status A to status D be executed only partially, such that the only bit to change from one to zero is the one second from the left in the status information. This means that a faulty status transition has occurred from status B to status C. However, this is not a problem as long as the condition applied in the recovery process is such that the status information of at least one memory block must express that the transaction is in a commitment process. Consequently, the situation, in which the status information of two memory blocks expresses that the transaction is in a commitment process, does not cause a problem.

The above-described bit vector presentation of status information also enables a status transition from any of states A-D to status E to be atomaric.

In an arrangement according to one embodiment of the invention, the management media 102 are adapted to use the memory blocks of the flash type memory device 101 as a recording memory for transient information in the processing of a transaction. In order to illustrate the operation of this embodiment, an exemplary situation is examined, in which payload data 141 needs to be written in a memory block 111 in a transaction, replacing older payload data 142 stored in a memory block 112. The payload data 142 constitutes valid payload data as the transaction starts. After the payload data 141 has been written in the memory block 111, a situation will arise in which said payload data must be changed. Without any general limitation, it can be assumed that a memory block 113 is free for writing. The management media 102 are adapted to set the status information of the memory block 111 to express that the payload data present in the memory block 111 is dirty, to write into the memory block 113 the changed payload data 141, which is represented by payload data 143, and to set the status information of the memory block 113 to express that the payload data present in the memory block 113 is correct.

Discussed in the following is the validation of payload data in an exemplary situation, in which payload data 141 has been written into a memory block 111 in a flash type memory device 101, replacing older payload data 142 stored in a memory block 112 of the flash type memory device 101. The payload data 142 constitutes valid payload data as the transaction starts.

In an arrangement according to one embodiment of the invention, the management media 102 are adapted to set up in a first operation the memory-block specific status information of the memory block 112 to express that the older payload data 142 present in the memory block 112 is dirty, and in a second operation to set up the memory-block specific status information of the memory block 111 to express that the payload data 141 present in the memory block 111 is valid, wherein said first operation precedes said second operation.

Considered now is a situation, in which a serious system error occurs after the first operation and before the second operation. In this case, the recovery process following the system error starts from a status in which the payload data 142 of the memory block 112 is dirty and the payload data 141 of the memory block 111 is correct. Thus, in the recovery process, the transaction continues as if the payload data 141 written in the memory block 111 were all payload data to be added, not replacing payload data present in any of the other memory blocks. The payload data 142 present in the memory block 112 is overlooked in the recovery process as it is dirty according to the status information of the memory block 112.

In an arrangement according to one embodiment of the invention, the management media 102 are adapted to set up in a first operation the memory-block specific status information of the memory block 111 to express that the payload data present in the memory block 111 is valid, and in a second operation to set up the memory-block specific status information of the memory block 112 to express that the payload data present in the memory block 112 is dirty, wherein said first operation precedes said second operation. Considered now is a situation, in which a serious system error occurs after the first operation and before the second operation. In this case, the recovery process following the system error starts from a status in which the payload data 141 of the memory block 111 is already valid, but the payload data 142 of the memory block 112 is also valid. In order to work out such conflict situation, the management media 102 are adapted, in the arrangement according to this embodiment of the invention, to read the value of a cyclic age indicator in the memory block 111, to read the value of a cyclic age indicator in the memory block 112, to set up the status information 132 of the memory block 112 to express that the payload data 142 is dirty, in response to the condition in which the cyclic age indicator of the memory block 111 has a value which in the sequence of a preset rule is subsequent to the value of the cyclic age indicator in the memory block 112, and to set up the status information 131 of the memory block 111 to express that the payload data 141 is dirty, in response to the condition in which the cyclic age indicator of the memory block 112 has a value which in the sequence of a preset rule is subsequent to the value of the cyclic age indicator in the memory block 111.

In an arrangement according to one embodiment of the invention, the management media 102 comprise at least one programmable processor. The management media 102 are adapted to implement the above-described operations by means of a readable computer program of said processor, which contains program elements such as subprograms, functions and data structures for instructing said processor to execute the above-described operations.

In an arrangement according to one embodiment of the invention, the management media 102 comprise at least one application specific integrated circuit (ASIC). The management media 102 are adapted to implement the above-described operations by means of interconnections between the logic ports, internal storage elements and timing devices of said application specific integrated circuit.

Figure 2:
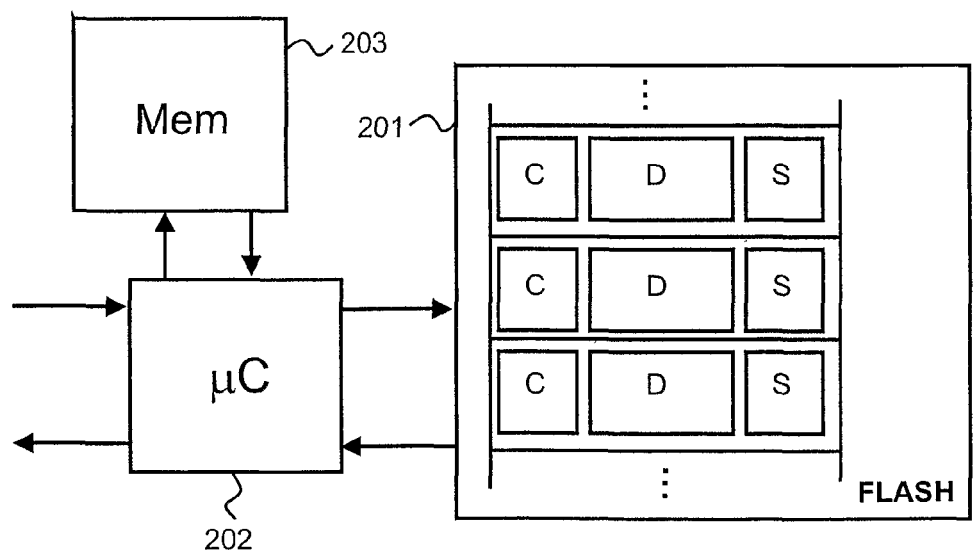
FIG. 2 shows an arrangement according to one embodiment of the invention for processing a transaction of information to be stored in a flash type memory device.

FIG. 2 shows an arrangement according to one embodiment of the invention for processing a transaction regarding information to be stored in a flash type memory device 201. The arrangement includes management media 202, which are linked to said flash type memory device 201. The management media 202 are adapted to execute a payload data writing operation relevant to said transaction into a memory block of said flash type memory device, to set up memory-block specific status information of said memory block to express that said transaction is in a commitment process, to read the memory-block specific status information of said memory block and to determine whether said memory-block specific status information has been set up to express that said transaction is in a commitment process, and to process the payload data written in said first memory block into valid payload data, in response to a situation in which said memory-block specific status information has been set up to express that said transaction is in a commitment process. The arrangement includes a buffer memory medium 203 adapted to store the information relevant to said transaction. The management media 202 are adapted to read said buffer memory medium 203 for the information, the writing of which into the flash type memory device 201 is desired in said transaction.

In an arrangement according to one embodiment of the invention, the management media 202 are adapted to execute parallel transactions in the buffer memory medium 203, whereby just one transaction needs to be run in the flash type memory device 201. Transactions can be performed in the buffer memory medium 203 the same way as in a flash type memory device. The buffer memory medium can be provided with storage-area specific status variables in a way consistent with sets of memory-block specific status information used in a flash type memory device. The storage area of a buffer memory refers to a section of storage space in the buffer memory, the information stored therein being managed as a single entity in a way consistent with information stored in a given memory block of a flash type memory device.

In an arrangement according to one embodiment of the invention, the buffer memory is a dynamic RAM memory (Random Access Memory).

Figure 3:
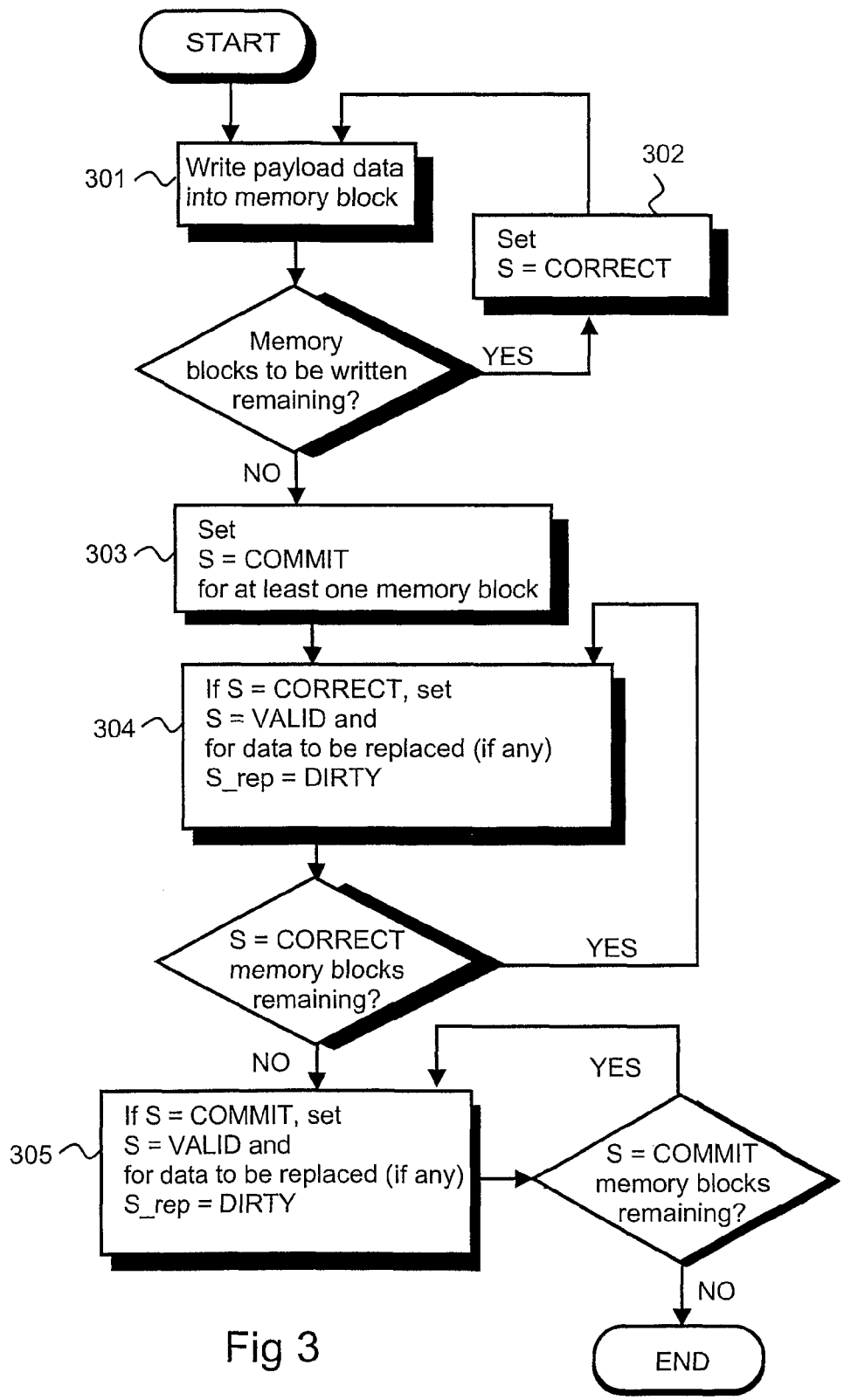
FIG. 3 shows a method according to one embodiment of the invention in a flowchart for executing a transaction of information to be stored in a flash type memory device.

FIG. 3 shows in a flowchart a method according to one embodiment of the invention for executing a transaction relevant to information to be stored in a flash type memory device. An operation 301 comprises executing a payload data writing operation relevant to said transaction into a memory block in a flash type memory device. Provided that said memory block was not the last memory block to be written, the process moves to an operation 302, in which memory-block specific status information S of said memory block is set up to express that the payload data of said memory block is correct (CORRECT). The process returns from operation 302 to operation 301, in which payload data is written in a next memory block to be processed. In the event that the memory block is the last memory block to be written, the process moves to an operation 303, in which status information S of at least one memory block, which contains payload data written in the transaction, is set up to express that said transaction is in a commitment process (COMMIT). Such a memory block functions as an expressive memory block. An operation 304 comprises setting up status information S of a memory block, the status information S of which expresses that payload data is correct (S=CORRECT), to express that the payload data is valid (VALID) payload data, and setting up status information S_rep of a memory block containing payload data to be replaced (if present) to express that said payload data to be replaced is dirty (DIRTY). An operation 305 comprises setting up status information S of a memory block, the status information S of which expresses that the transaction is in a commitment process (S=COMMIT), to express that the payload data is valid (VALID) payload data, and setting up status information S_rep of a memory block containing payload data to be replaced (if present) to express that said payload data to be replaced is dirty (DIRTY).

Preferably, the status information S of just one memory block containing payload data written in a transaction is set up to express that said transaction is in a commitment process (COMMIT).

In a method according to one embodiment of the invention, said expressive memory block, among those memory blocks of said flash type memory device in which payload data is written in connection with said transaction, is the one with the smallest physical address. In a method according to one embodiment of the invention, said expressive memory block, among those memory blocks of said flash type memory device in which payload data is written in connection with said transaction, is the one with the greatest physical address.

In a method according to one embodiment of the invention, said expressive memory block, among those memory blocks of said flash type memory device in which payload data is written in connection with said transaction, is the last one to have payload data written therein in connection with said transaction.

In the event that the expressive memory block is not the last memory block to be written, the status information of the last written memory block is set up to express that the payload data is correct (CORRECT) before the status information of the expressive memory block is set up to express that the transaction is in a commitment status (COMMIT). Hence, the status information of an expressive memory block is set up in two operations: first said memory-block specific status information is set up to express that the payload data present in the expressive memory block is correct (CORRECT) and subsequently said memory-block specific status information is set up to express that the transaction is in a commitment process (COMMIT).

In a method according to one embodiment of the invention, the physical address of a memory block is stored in a scratch pad storage in operation 301 and the beginning of operation 303 comprises selecting the smallest (or greatest) from among the stored physical addresses of memory blocks.

In a method according to one embodiment of the invention, the memory block, in which payload data is written in a transaction, has also written therein identification data identifying said transaction. Thus, several parallel transactions can be executed concurrently in a flash type memory device. The transaction, under which a given memory block is operated, can be determined on the basis of said identification data.

In a method according to one embodiment of the invention, the identification data present in a memory block and identifying a transaction is set to zero after the status information of said memory block has been set up to express that the payload data present in said memory block is valid (VALID) payload data. The knowledge about the fact that the identification data identifying a transaction should be zero when the status information expresses that the payload data is valid, can be used for detecting malfunctions.

In a method according to one embodiment of the invention, an operation 304, wherein payload data written in a memory block M is processed into valid payload data, includes the following suboperations:

Q1: Memory-block specific status information S_rep of a memory block N, containing payload data to be replaced by payload data written in a memory block M, is set up to express that the payload data present in the memory block N is dirty (DIRTY), whereafter Q2: memory-block specific status information S of the memory block M is set up to express that the payload data present in the memory block M is valid (VALID).

In a method according to one embodiment of the invention, the operation 305 includes corresponding suboperations Q1 and Q2.

In a method according to one embodiment of the invention, the method comprises writing into a memory block M in operation 301 a cyclic age indicator which expresses that the payload data to be written in the memory block M in the on-going transaction is more recent than the payload data written in a memory block N in an earlier transaction. Said cyclic age indicator can be updated for example in such a manner that the value of the cyclic age indicator is augmented by one as the transaction starts and, when the cyclic age indicator reaches a preset final value, it will be set to a predetermined initial value. Thus, each transaction has a certain cyclic age indicator value.

In a method according to one embodiment of the invention, the operation 304, wherein the payload data written in said memory block M is processed into valid payload data, includes the following suboperations:
P1: the memory-block specific status information S of the memory block M is set up to express that the payload data present in the memory block M is valid (VALID), whereafter
P2: the memory-block specific status information S_rep of the memory block N, containing the payload data to be replaced by the payload data written in the memory block M, is set up to express that the payload data present in the memory block N is dirty (DIRTY).

In a method according to one embodiment of the invention, the operation 305 includes corresponding suboperations P1 and P2.

In a method according to one embodiment of the invention, the method comprises writing memory-block specific status information S in a storage space subsequent to information T to be written in said memory block. The storage space subsequent to information T refers to an area in the address space of said memory block, which in the ascending sequence of physical addresses follows that area in the address space of said memory block in which the information T is stored. This enables writing the information T and the memory-block specific status information S in a single session one after the other and the correctness of the status information S serves as certifier that writing of the information T has been successful.

In a method according to one embodiment of the invention, the information T is identification data which singles out the on-going transaction.

In a method according to one embodiment of the invention, the information T represents header information of said memory block. The header information of a memory block consists typically of control data C to be stored in the memory block.

In a method according to one embodiment of the invention, the information T represents all other information to be written in said memory block except said status information.

In a method according to one embodiment of the invention, the memory-block specific status information S expresses one of the following conditions:
FREE: memory block is free for writing,
CORRECT: payload data in memory block is correct,
COMMIT: transaction is in a commitment process,
VALID: payload data in memory block is valid, and
DIRTY: payload data in memory block is dirty.

In a method according to one embodiment of the invention, any of the following status transitions: from status FREE to status CORRECT, from status CORRECT to status COMMIT, from status COMMIT to status VALID, and from status VALID to status DIRTY, is implemented by changing the value of just one bit in a bit vector representing said memory-block specific status information.

Figure 4:
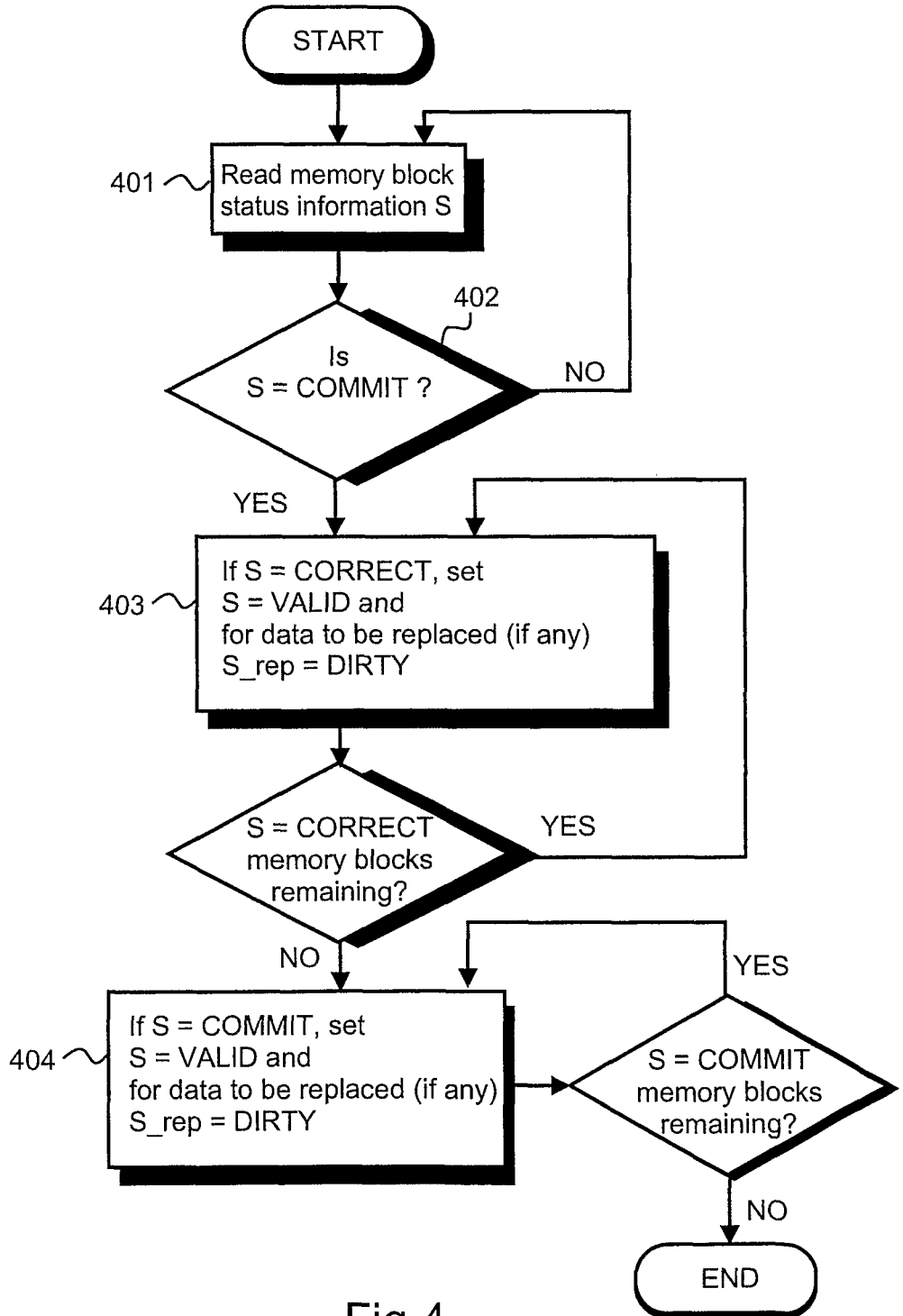
FIG. 4 shows a recovery method according to one embodiment of the invention in a flowchart for recovering from a system error occurred during a transaction in equipment based on a flash type memory device.

FIG. 4 shows in a flowchart a recovery method according to one embodiment of the invention for recovering from a system error occurred during a transaction in equipment based on a flash type memory device. An operation 401 comprises reading memory-block specific status information S relevant to a memory block of said flash type memory device. A decision-making operation 402 comprises detecting whether said memory-block specific status information S expresses that said transaction is in a commitment process (S =COMMIT). If this is not the case, the process proceeds to reading status information of the next memory block in operation 401. In the event that the memory-block specific status information S expresses that said transaction is in a commitment process (COMMIT), the process moves to an operation 403. The operation 403 comprises setting up the status information S of a memory block whose status information S expresses that the payload data is correct (S=CORRECT) to express that the payload data is valid (VALID) payload data, and setting up the status information S_rep of a memory block containing payload data to be replaced (if present) to express that said payload data to be replaced is dirty (DIRTY). An operation 404 comprises setting up the status information S of a memory block whose status information S expresses that the transaction is in a commitment process (S=COMMIT) to express that the payload data is valid (VALID) payload data, and setting up the status information S_rep of a memory block containing payload data to be replaced (if present) to express that said payload data to be replaced is dirty (DIRTY).

Examined now is an exemplary situation in which the status information of a memory block M expresses that the payload data is valid (VALID) and also the status information of a memory block N expresses that the payload data is valid (VALID). The payload data present in one memory block M or N is intended for replacing the payload data present in the other memory block N or M but, because of a system error, the status information of the memory block containing payload data to be replaced has not been set up to express that the payload data is dirty (DIRTY).

A recovery method according to one embodiment of the invention comprises:
reading a cyclic age indicator value from memory block M,
reading a cyclic age indicator value from memory block N,
in response to the situation in which the cyclic age indicator of memory block M has a value which in the sequence of a preset rule is subsequent to the cyclic age indicator value of memory block N, setting up the status information of memory block N to express that the payload data present in memory block N is dirty (DIRTY), and
in response to the situation in which the cyclic age indicator of memory block N has a value which in the sequence of said preset rule is subsequent to the cyclic age indicator value of memory block M, setting up the status information of memory block M to express that the payload data present in memory block M is dirty (DIRTY).

A computer program according to one embodiment of the invention for processing a transaction relevant to information to be stored in a flash type memory device contains program elements as follows:
   program elements for instructing a processing unit to execute a payload data writing operation relevant to said transaction into a memory block of said flash type memory device,
   program elements for instructing the processing unit to set up memory-block specific status information of said memory block to express that said transaction is in a commitment process,
   program elements for instructing the processing unit to read the memory-block specific status information of said memory block and to determine whether said memory-block specific status information has been set up to express that said transaction is in a commitment process, and
   program elements for instructing the processing unit to process the payload data written in said memory block into valid payload data in response to the condition in which said memory-block specific status information has been set up to express that said transaction is in a commitment process.

Said program elements can be for example subprograms or functions. Said processing unit can be for example a processor included in the management medium 102 shown in FIG. 1.

A computer program according to one embodiment of the invention is stored in a readable recording medium of the processing unit, such as for example on an optical disk (Compact Disk).

As obvious for a person skilled in the art, the invention and its embodiments are not limited to the foregoing exemplary embodiments, but the invention and its embodiments can be subjected to a multitude of modifications within the scope of the independent claim.

The invention claimed is:

1. A method for executing a transaction regarding information to be stored in a flash type memory device, the method comprising:
   executing a payload data writing operation relevant to said transaction into a first memory block of said flash type memory device,
   setting up memory-block specific status information of said first memory block to express that a) payload data written in said first memory block is relevant and b) said transaction is in a commitment process, and
   processing the payload data written in said first memory block into valid payload data in response to a condition that said memory-block specific status information has been set up to express that a) the payload data written in said first memory block is relevant b) said transaction is in a commitment process.

2. The method as set forth in claim 1, wherein said first memory block, among those memory blocks of said flash type memory device that the payload data is written in connection with said transaction, is the one with a smallest physical address.

3. The method as set forth in claim 1, wherein said first memory block, among those memory blocks of said flash type memory device that the payload data is written in connection with said transaction, is the one with a greatest physical address.

4. The method as set forth in claim 2, wherein said memory-block specific status information is set up in two operations: first said memory-block specific status information is set up to express that the payload data present in said first memory block is correct, and subsequently said memory-block specific status information is set up to express that said transaction is in a commitment process.

5. The method as set forth in claim 1, wherein said first memory block, among those memory blocks of said flash type memory device that the payload data is written in connection with said transaction, is a last one to have payload data written therein in connection with said transaction.

6. The method as set forth in claim 1, wherein in said first memory block is written identification data identifying said transaction.

7. The method as set forth in claim 1, wherein in said first memory block is written a cyclic age indicator expressing that the payload data present in said first memory block is more recent than the payload data present in a second memory block of said flash type memory device.

8. The method as set forth in claim 7, wherein the operation, wherein the payload data written in said first memory block is processed into valid payload data, contains the following suboperations:
   setting up the memory-block specific status information of said first memory block to express that the payload data present in said first memory block is valid, followed by
   setting up the memory-block specific status information of said second memory block to express that the payload data present in said second memory block is dirty.

9. The method as set forth in claim 1, wherein the operation , wherein the payload data written in said first memory block is processed into valid payload data, contains the following suboperations:
   setting up the memory-block specific status information of a second memory block of said flash type memory device to express that the payload data present in said second memory block is dirty, followed by
   setting up the memory-block specific status information of said first memory block to express that the payload data present in said first memory block is valid.

10. The method as set forth in claim 1, wherein said memory-block specific status information is written in said first memory block into a storage space subsequent to other information present in said first memory block.

11. The method as set forth in claim 1, wherein said memory-block specific status information is written in said first memory block into a storage space subsequent to header information present in said first memory block.

12. The method as set forth in claim 6, wherein said memory-block specific status information is written in said first memory block into a storage space subsequent to the identification data identifying said transaction.

13. The method as set forth in claim 1, wherein said memory-block specific status information expresses one of the following conditions:
   A: said first memory block is free for writing,
   B: payload data present in said first memory block is correct,
   C: said transaction is in a commitment process,
   D: payload data present in said first memory block is valid, and
   E: payload data present in said first memory block is dirty.

14. The method as set forth in claim 13, wherein any of the following status transitions: from status A to status B, from status B to status C, from status C to status D, and from status D to status E, is implemented by changing a value of just one bit in a bit vector representing said memory-block specific status information.

15. A recovery method for recovering from a system error occurred during a transaction in equipment based on a flash type memory device, the recovery method comprising:
   reading memory-block specific status information regarding a first memory block of said flash type memory device,
   determining whether said memory-block specific status information expresses that a) payload data present in said first memory block is relevant and b) said transaction is in a commitment process, and
   processing the payload data present in said first memory block into valid payload data in response to a condition that said memory-block specific status information expresses that a) the payload data present in said first memory block is relevant and b) said transaction is in a commitment process.

16. The recovery method as set forth in claim 15, wherein the recovery method comprises:
   reading the value of a cyclic age indicator in said first memory block,
   reading the value of a cyclic age indicator in a second memory block of said flash type memory device,
   in response to a condition of the cyclic age indicator of said second memory block having a value that in a sequence of a preset rule is subsequent to the value of the cyclic age indicator in said first memory block, setting up the status information of said first memory block to express that the payload data present in said first memory block is dirty, and
   in response to a condition of the cyclic age indicator of said first memory block having a value that in the sequence of a preset rule is subsequent to the value of the cyclic age indicator in said second memory block, setting up the status information of said second memory block to express that the payload data present in said second memory block is dirty.

17. An arrangement for processing a transaction regarding information to be stored in a flash type memory device, wherein the arrangement comprises management media, the management media are linked to said flash type memory device and which are adapted to:
   execute a payload-data writing operation relevant to said transaction into a first memory block of said flash type memory device,
   set up memory-block specific status information of said first memory block to express that a) payload data written in said first memory block is relevant and b) said transaction is in a commitment process,
   read the memory-block specific status information of said first memory block and determine whether said memory-block specific status information has been set up to express that a) the payload data present in said first memory block is relevant and b) said transaction is in a commitment process, and
   process the payload data present in said first memory block into valid payload data in response to a condition of said memory-block specific status information having been set up to express that a) the payload data present in said first memory block is relevant and b) said transaction is in a commitment process.

18. The arrangement as set forth in claim 17, wherein, among those memory blocks of said flash type memory device that the payload data is written in connection with said transaction, said management media are adapted to select said first memory block to be the one with a smallest physical address.

19. The arrangement as set forth in claim 17, wherein, among those memory blocks of said flash type memory device that the payload data is written in connection with said transaction, said management media are adapted to select said first memory block to be the one with a greatest physical address.

20. The arrangement as set forth in claim 18, wherein said management media are adapted to set up in a first operation said memory-block specific status information to express that payload data present in said first memory block is correct, and in a second operation to set up said memory-block specific status information to express that said transaction is in a commitment process, wherein said first operation precedes said second operation.

21. The arrangement as set forth in claim 17, wherein, among those memory blocks of said flash type memory device that the payload data is written in connection with said transaction, said management media are adapted to select said first memory block to be a last one to have payload data written therein in connection with said transaction.

22. The arrangement as set forth in claim 17, wherein said management media are adapted to write into said first memory block identification data identifying said transaction.

23. The method as set forth in claim 17, wherein said management media are adapted to determine a value subsequent in a sequence of a preset rule to the value of a cyclic age indicator present in a second memory block of said flash type memory device, and to write said sequentially subsequent value into said first memory block.

24. The arrangement as set forth in claim 23, wherein said management media are adapted to set up in a first operation the memory-block specific status information of said first memory block to express that the payload data present in said first memory block is valid, and in a second operation to set up memory-block specific status information of said second memory block to express that payload data present in said second memory block is dirty, wherein said first operation precedes said second operation.

25. The arrangement as set forth in claim 17, wherein said management media are adapted to set up in a first operation the memory-block specific status information of a second memory block of said flash type memory device to express that payload data present in said second memory block is dirty, and in a second operation to set up the memory-block specific status information of said first memory block to express that the payload data present in said first memory block is valid, wherein said first operation precedes said second operation.

26. The arrangement as set forth in claim 17, wherein said management media are adapted to write said memory-block specific status information in said first memory block into a storage space subsequent to other information present in said first memory block.

27. The arrangement as set forth in claim 17, wherein said management media are adapted to write said memory-block specific status information in said first memory block into a storage space subsequent to header information present in said first memory block.

28. The arrangement as set forth in claim 22, wherein said management media are adapted to write said memory-block specific status information in said first memory block into a storage space subsequent to the identification data identifying said transaction.

29. The arrangement as set forth in claim 17, wherein said management media are adapted to express, by means of said memory-block specific status information, the following possible conditions:
   A: said first memory block is free for writing,
   B: payload data present in said first memory block is correct,
   C: said transaction is in a commitment process,
   D: payload data present in said first memory block is valid, and
   E: payload data present in said first memory block is dirty.

30. The arrangement as set forth in claim 29, wherein said management media are adapted to implement any of the following status transitions: from status A to status B, from status B to status C, from status C to status D, and from status D to status E, by changing a value of just one bit in a bit vector representing said memory-block specific status information.

31. The arrangement as set forth in claim 23, wherein said management media are adapted to:
   read the value of a cyclic age indicator in said first memory block,
   read the value of a cyclic age indicator in said second memory block,
   set up the status information of said second memory block to express that the payload data present in said second memory block is dirty, in response to a condition of the cyclic age indicator of said first memory block having a value that in the sequence of said preset rule is subsequent to the value of the cyclic age indicator in said second memory block, and
   set up the status information of said first memory block to express that the payload data present in said first memory block is dirty, in response to a condition of the cyclic age indicator of said second memory block having a value that in the sequence of said preset rule is subsequent to the value of the cyclic age indicator in said first memory block.

32. The arrangement as set forth in claim 17, wherein the arrangement includes a buffer memory medium adapted to store the information relevant to said transaction, and said management media are adapted to read said buffer memory medium for the information to be written onto said flash type memory device in said transaction.

33. The arrangement as set forth in claim 17, wherein said management media are adapted to use the memory blocks of said flash type memory device as a recording memory for transient information in the processing of said transaction.

34. A non-transitory computer readable medium encoded with a computer program for processing a transaction regarding information to be stored in a flash type memory device, wherein the computer program comprises:
   program elements for instructing a processing unit to execute a payload-data writing operation relevant to said transaction into a memory block of said flash type memory device,
   program elements for instructing the processing unit to set up memory-block specific status information of said memory block to express that a) payload data written in a first memory block is relevant and b) said transaction is in a commitment process,
   program elements for instructing the processing unit to read the memory-block specific status information of said memory block and to determine whether said memory-block specific status information has been set up to express that a) the payload data present in said first memory block is relevant and b) said transaction is in a commitment process, and
   program elements for instructing the processing unit to process the payload data present in said memory block into valid payload data in response to a condition in of said memory-block specific status information having been set up to express that a) the payload data present in said first memory block is relevant and b) said transaction is in a commitment process.

\* \* \* \* \*